United States Patent
Ramakrishnan et al.

(10) Patent No.: US 12,337,822 B2
(45) Date of Patent: Jun. 24, 2025

(54) MULTI-WHEEL DRIVE HYBRID VEHICLE WITH MULTI-MODE FUNCTIONALITY

(71) Applicant: Cummins Inc., Columbus, IN (US)

(72) Inventors: Kesavan Ramakrishnan, Columbus, IN (US); Manik Narula, Columbus, IN (US)

(73) Assignee: Cummins Inc., Columbus, IN (US)

(*) Notice: Subject to any disclaimer, the term of this patent is extended or adjusted under 35 U.S.C. 154(b) by 221 days.

(21) Appl. No.: 18/018,955

(22) PCT Filed: May 25, 2021

(86) PCT No.: PCT/US2021/033971
§ 371 (c)(1),
(2) Date: Jan. 31, 2023

(87) PCT Pub. No.: WO2022/026040
PCT Pub. Date: Feb. 3, 2022

(65) Prior Publication Data
US 2023/0365120 A1 Nov. 16, 2023

Related U.S. Application Data

(60) Provisional application No. 63/059,332, filed on Jul. 31, 2020.

(51) Int. Cl.
*B60W 20/20* (2016.01)
*B60W 10/02* (2006.01)
(Continued)

(52) U.S. Cl.
CPC ............ *B60W 20/20* (2013.01); *B60W 10/02* (2013.01); *B60W 20/14* (2016.01);
(Continued)

(58) Field of Classification Search
CPC ...... B60W 20/20; B60W 10/02; B60W 20/14; B60W 30/18127; B60W 2520/28; B60W 2556/50
(Continued)

(56) References Cited

U.S. PATENT DOCUMENTS 6,406,105 B1   6/2002   Shimada et al.
6,470,984 B1   10/2002   Nakajima et al.
(Continued)

FOREIGN PATENT DOCUMENTS

| | | |
|---|---|---|
| CN | 1994773 A | 7/2007 |
| CN | 108482103 A | 9/2018 |
| WO | 2017100258 A1 | 6/2017 |

OTHER PUBLICATIONS

International Search Report and Written Opinion for International patent application No. PCT/EP2021/033971, filed May 25, 2021, mailed Sep. 30, 2021.

*Primary Examiner* — Kira Nguyen
(74) *Attorney, Agent, or Firm* — Faegre Drinker Biddle & Reath LLP

(57) ABSTRACT

The present disclosures relate to methods and systems for a hybrid powertrain. The hybrid powertrain system includes an integrated axle configured to provide mechanical power to a first pair of wheels, the integrated axle comprising a first motor-generator and a first drive axle such that the first motor-generator and at least a portion of the first drive axle are mechanically coupled to a common housing. The system also includes a second motor-generator configured to be mechanically coupled with an engine via a first clutch and mechanically coupled with a second drive axle via a second clutch, the second drive axle mechanically coupled with a second pair of wheels. A controller is electrically coupled with the first and second motor-generators, the engine, and the first and second clutches, the controller configured to
(Continued)

enable a fully electric mode, a series hybrid mode, a parallel hybrid mode, and a regenerative mode of operation.

19 Claims, 6 Drawing Sheets

(51) Int. Cl.
 *B60W 20/14* (2016.01)
 *B60W 30/18* (2012.01)
(52) U.S. Cl.
 CPC ... *B60W 30/18127* (2013.01); *B60W 2520/28* (2013.01); *B60W 2556/50* (2020.02)
(58) Field of Classification Search
 USPC .......................................................... 701/22
 See application file for complete search history.

(56) References Cited

U.S. PATENT DOCUMENTS

| | | |
|---|---|---|
| 6,569,055 B2 | 5/2003 | Urasawa et al. |
| 6,886,648 B1 | 5/2005 | Hata et al. |
| 7,104,617 B2 | 9/2006 | Brown |
| 7,497,285 B1 | 3/2009 | Radev |
| 7,867,125 B2 | 1/2011 | Kim et al. |
| 7,918,760 B2 | 4/2011 | Yang |
| 8,083,016 B2 | 12/2011 | Naik |
| 8,448,730 B2 | 5/2013 | Muller |
| 8,504,238 B2 | 8/2013 | Yu |
| 8,758,192 B2 | 6/2014 | Smith |
| 8,894,542 B2 | 11/2014 | Aoki |
| 9,154,060 B2 | 10/2015 | Noguchi |
| 9,586,486 B2 | 3/2017 | Kunz et al. |
| 10,040,441 B2 | 8/2018 | Fuchtner |
| 10,543,739 B1* | 1/2020 | Zhou .................... B60W 10/06 |
| 2007/0200428 A1 | 8/2007 | Buglione et al. |
| 2007/0265126 A1 | 11/2007 | Janson et al. |
| 2010/0193269 A1 | 8/2010 | Fuchtner et al. |
| 2014/0228168 A1 | 8/2014 | Kaufman et al. |
| 2016/0039277 A1 | 2/2016 | Falls et al. |
| 2017/0225587 A1 | 8/2017 | Newman et al. |
| 2019/0023257 A1 | 1/2019 | Doering et al. |
| 2020/0164734 A1* | 5/2020 | David .................... B60K 6/365 |
| 2020/0298822 A1* | 9/2020 | Miyamoto ........... B60K 17/356 |
| 2021/0155223 A1* | 5/2021 | Hamano ............... B60W 20/50 |

* cited by examiner

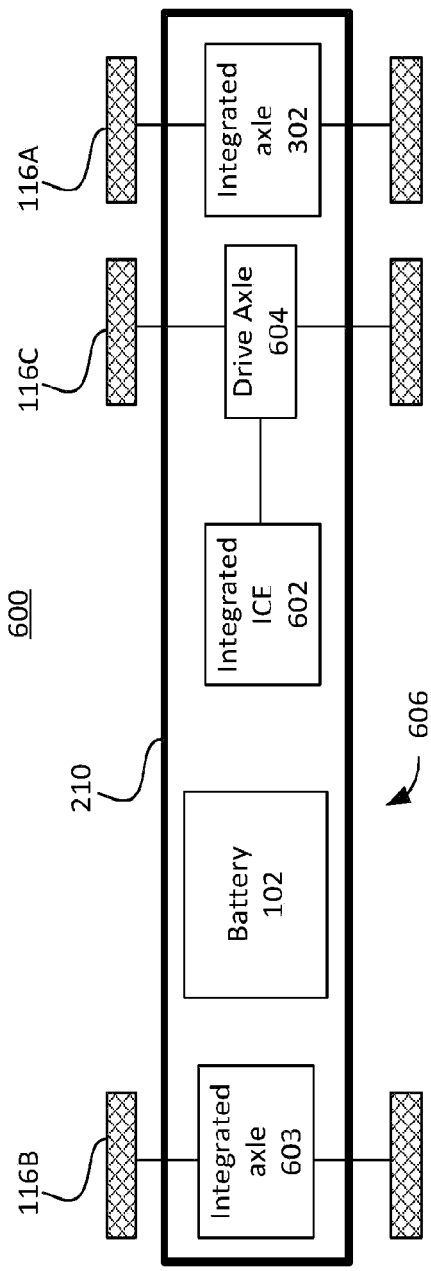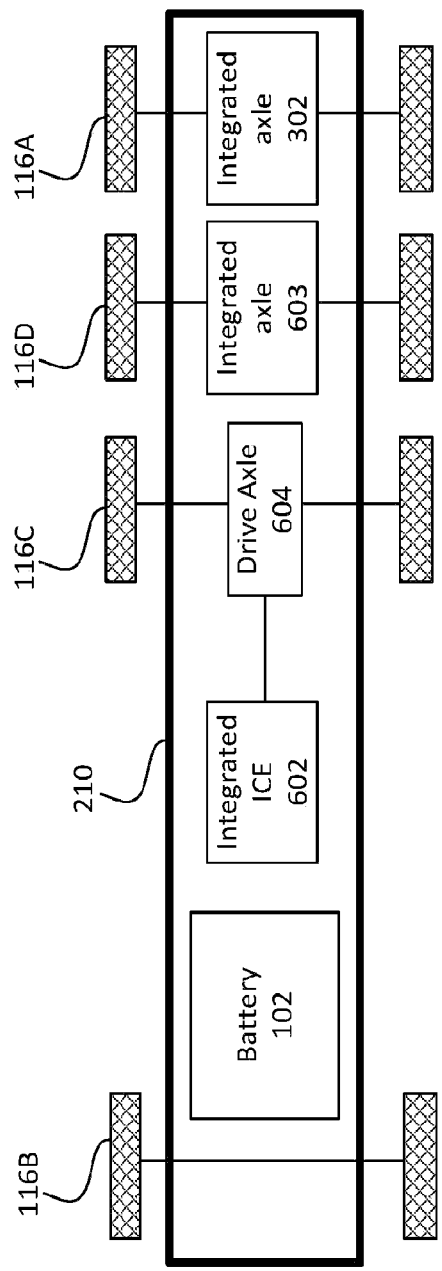

800

MULTI-WHEEL DRIVE HYBRID VEHICLE WITH MULTI-MODE FUNCTIONALITY

CROSS-REFERENCE TO RELATED APPLICATIONS

This application is a national stage of and claims priority to International Patent Application No. PCT/US2021/033971, filed May 25, 2021, which claims the benefit of U.S. provisional patent application Ser. No. 63/059,332, filed Jul. 31, 2020, which are incorporated herein by reference in their entireties.

STATEMENT REGARDING FEDERALLY SPONSORED RESEARCH OR DEVELOPMENT

This invention was made with Government support under DE-AC02-06CH11357 awarded by DOE. The Government has certain rights in this invention.

FIELD OF THE DISCLOSURE

The present disclosure relates generally to hybrid vehicles, especially to drivetrains of hybrid vehicles having multiple modes of operation.

BACKGROUND OF THE DISCLOSURE

Some vehicles include a mechanical power source in the form of an engine combined with a motor generator, known as a hybrid vehicle. In some situations, driving the vehicle using both the engine and the motor generator is desirable, whereas in other situations, the engine or the motor generator may be deactivated such that the vehicle runs on only one instead of both of the mechanical power sources. The combination of the engine and automatic transmission with the motor generator, and the provision of a center differential gear, makes it possible to realize four-wheel drive (4WD).

FIG. 1A shows an example of a prior-art hybrid vehicle that uses a parallel hybrid system 100A. The parallel hybrid system 100A incorporates a battery 102 that is electrically coupled to an electric motor 106 via a converter 104. The system 100 also includes a fuel reservoir 108 such as a fuel tank fluidly coupled to an engine 110. In all figures shown herein, solid lines indicate mechanical connections, while broken lines indicate electrical connections. Both the electric motor 106 and the engine 110 provide mechanical power to a transmission 112 which is coupled to both, and the mechanical power causes the differential gears 114 to move the wheels 116, thus driving the vehicle.

FIG. 1B shows an example of a prior-art hybrid vehicle that uses a series hybrid system 100B. The engine 110 is now mechanically coupled with a generator 118 which is electrically coupled with the charger 120, converter 104, and electric motor 106. The converter 104 is electrically coupled with the battery 102. The assembly of the generator 108, charger 120, converter 104, and electric motor 106 may be referred to as a motor-generator which not only provides mechanical power to drive the vehicle but also provides electrical power to charge the battery 102 when necessary.

FIG. 2 shows an example of a prior-art hybrid vehicle system 200 that incorporates the battery or batteries 102, the engine 110 (for simplicity, the fuel reservoir 108 is abbreviated in this figure), two motor-generators 202, 204, and two clutches 206, 208 in order to control how mechanical power and electrical power are utilized. For example, when the clutch 208 is disengaged to disconnect the engine 110 from the rest of the system 200, the system 200 becomes a fully electric vehicle that does not require the use of a fuel-powered engine 110. For example, when the motor-generator 204 is disengaged, the engine 110 as well as the motor-generator 202 can provide mechanical power to the differential gears 114, thereby emulating the parallel hybrid system. For example, when the clutch 206 is disengaged, the mechanical power from the engine 110 can be used to power the motor-generator 204 while the other motor-generator 202 provides the mechanical power to the differential gears 114, thereby emulating the series hybrid system.

However, the system 200 requires a drivetrain that includes a driveshaft that extends linearly between the engine 110 to the differential gears 114. As such, the chassis frames 210 of the vehicle do not allow for the batteries 102 to be included between the chassis frames 210 in proximity to the engine 110 for safety reasons. Therefore, in the system 200 as shown, the batteries 102 need to be disposed on an exterior of the chassis frames 210, which has smaller space compared to within the chassis frames 210. Furthermore, the system 200 is not 4WD because only one pair of wheels 116A receives power from the engine 110 or the motor-generator 202, 202. Because of this, the other pair of wheels 116B does not have an engine or motor coupled thereto, and as such, the system 200 cannot provide as much power as 4WD. In view of the above, there is a need for a more compact and effective hybrid system that allows for the components within the chassis frames to be reorganized such that more space is provided for the batteries 102 to be disposed, all the while providing the benefits of a 4WD system.

SUMMARY

Various embodiments of the present disclosure relate to methods and systems for a hybrid powertrain. The hybrid powertrain system includes an integrated axle configured to provide mechanical power to a first pair of wheels, the integrated axle comprising a first motor-generator and a first drive axle such that the first motor-generator and at least a portion of the first drive axle are mechanically coupled to a common housing. The system also includes a second motor-generator configured to be mechanically coupled to an engine via a first clutch and mechanically coupled to a second drive axle via a second clutch, the second drive axle mechanically coupled to a second pair of wheels. A controller is also electrically coupled with the first and second motor-generators, the engine, and the first and second clutches, the controller configured to enable a fully electric mode, a series hybrid mode, a parallel hybrid mode, and a regenerative mode of operation.

In some examples, the system further includes a plurality of sensors, a user interface, and a global positioning system (GPS) electrically coupled with the controller. The controller may include a mode determination module configured to determine which of the modes to activate based on input data obtained from the plurality of sensors, the user interface, and the GPS.

In some examples, the controller can obtain the input data from the sensors, the user interface, and the GPS; determine a mode in which to operate the hybrid system; engage or disengage at least one of the first or second clutch in response to the determination; and activate or deactivate at least one of the first motor-generator, the second motor-generator, or the engine in response to the determination. In some examples, controller is further configured to enable an advanced fully electric mode that provides greater driving power than the fully electric mode, an advanced parallel hybrid mode that provides greater driving power than the parallel hybrid mode, and an advanced regenerative mode that provides greater braking power than the regenerative mode.

In some examples, the hybrid system is implemented in a transmission-less hybrid vehicle in which the engine is configured to provide mechanical power to the second drive axle when the hybrid vehicle is operating within a predetermined revolutions-per-minute (RPM) threshold range. In some examples, a third pair of wheels that are mechanically coupled with a second integrated axle may be included in the system. Some examples may include a fourth pair of wheels in the system. In some examples, the second integrated axle includes a third motor-generator coupled with a third drive axle. In some examples, the regenerative mode of operation enables regenerative braking on the first, second, and third drive axles. In some examples, the engine is an internal combustion engine (ICE) such that the ICE and the second motor-generator form an integrated ICE that is mechanically coupled to the common housing.

In some examples, the system includes a chassis connecting the first and second pairs of wheels, the chassis comprising two side frame rails each connecting the first pair of wheels with the second pair of wheels, as well as a battery disposed in a space between the two side frame rails and electrically coupled with the first and second motor-generators. In some examples, the regenerative mode of operation enables regenerative braking on both the first and second drive axles.

Also disclosed herein are controller for the hybrid vehicle powertrain system, which includes a receiver configured to receive data signals from one or more of: sensors, user interface, or global positioning system (GPS), a mode determination module configured to determine whether to enable a fully electric mode, a series hybrid mode, a parallel hybrid mode, or a regenerative mode of operation based on the received data signals, and a transmitter configured to transmit, based on the determination, control signals. The control signals are transmitted to an integrated axle configured to provide mechanical power to a first pair of wheels, the integrated axle comprising a first motor-generator and a first drive axle such that the first motor-generator and at least a portion of the first drive axle are mechanically coupled to a common housing. The control signals are also transmitted to an engine, a first clutch, a second clutch, and a second motor-generator configured to be mechanically coupled with the engine via the first clutch and mechanically coupled with a second drive axle via the second clutch, the second drive axle mechanically coupled with a second pair of wheels.

In some examples, the control signals can engage or disengage at least one of the first or second clutch in response to the determination and activate or deactivate at least one of the first motor-generator, the second motor-generator, or the engine in response to the determination. In some examples, the mode determination module further configured to determine whether to enable an advanced fully electric mode that provides greater driving power than the fully electric mode, an advanced parallel hybrid mode that provides greater driving power than the parallel hybrid mode, or an advanced regenerative mode that provides greater braking power than the regenerative mode.

Furthermore, disclosed herein are methods of powering the powertrain system for hybrid vehicles, where the methods involve receiving, by a receiver, data signals from one or more of: sensors, user interface, or global positioning system (GPS); determining, by a mode determination module based on the received data signals, whether to enable one of the following modes: a fully electric mode, a series hybrid mode, a parallel hybrid mode, or a regenerative mode of operation; and transmitting, by a transmitter based on the determined mode, control signals to at least one of: an integrated axle, an engine, a first clutch, a second clutch, or a second motor-generator. According to the method, integrated axle can provide mechanical power to a first pair of wheels, the integrated axle comprising a first motor-generator and a first drive axle such that the first motor-generator and at least a portion of the first drive axle are mechanically coupled to a common housing, and the second motor-generator can be mechanically coupled with the engine via the first clutch and mechanically coupled with a second drive axle via the second clutch, the second drive axle mechanically coupled with a second pair of wheels.

In some examples, transmitting the control signals include engaging or disengaging at least one of the first or second clutch in response to the determination and activating or deactivating at least one of the first motor-generator, the second motor-generator, or the engine in response to the determination. In some examples, the method further includes determining, by the mode determination module based on the received data signals, whether to enable: an advanced fully electric mode that provides greater driving power than the fully electric mode, an advanced parallel hybrid mode that provides greater driving power than the parallel hybrid mode, or an advanced regenerative mode that provides greater braking power than the regenerative mode.

While multiple embodiments are disclosed, still other embodiments of the present disclosure will become apparent to those skilled in the art from the following detailed description, which shows and describes illustrative embodiments of the disclosure. Accordingly, the drawings and detailed description are to be regarded as illustrative in nature and not restrictive.

BRIEF DESCRIPTION OF THE DRAWINGS

The above-mentioned and other features and advantages of this disclosure, and the manner of attaining them, will become more apparent and the disclosure itself will be better understood by reference to the following description of embodiments of the disclosure taken in conjunction with the accompanying drawings, wherein:

FIG. 6 is a schematic diagram of a 6×6 drivetrain hybrid system according to some embodiments.

FIG. 7 is a schematic diagram of a 8×6 drivetrain hybrid system according to some embodiments.

Figure 1A:
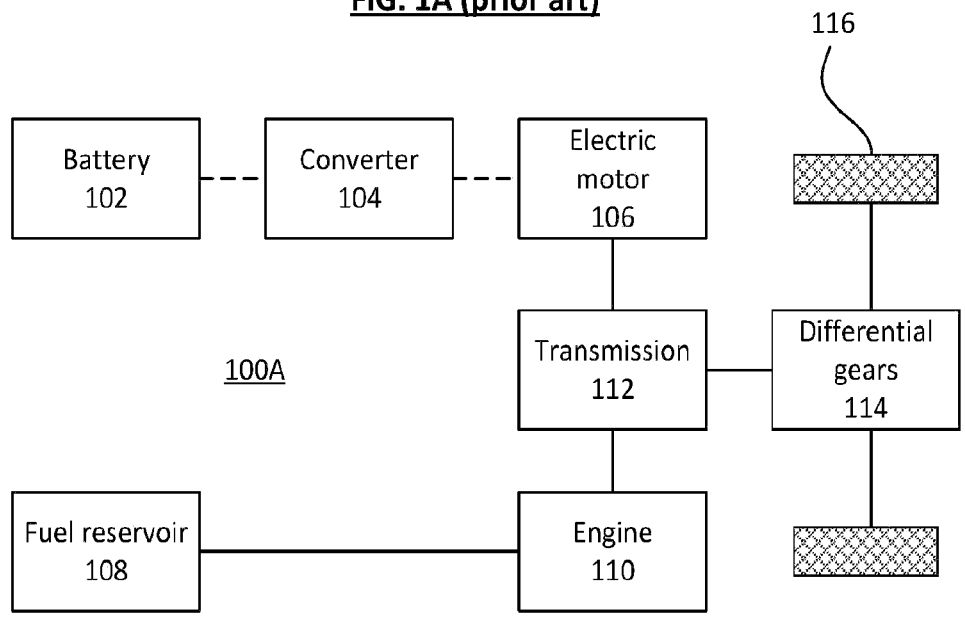
FIG. 1A is a schematic diagram of a parallel hybrid vehicle system as known in the art.

Corresponding reference characters indicate corresponding parts throughout the several views. The exemplifications set out herein illustrate exemplary embodiments of the disclosure and such exemplifications are not to be construed as limiting the scope of the disclosure in any manner. While the present disclosure is amenable to various modifications and alternative forms, specific embodiments have been shown by way of example in the drawings and are described in detail below. The intention, however, is not to limit the present disclosure to the particular embodiments described. On the contrary, the present disclosure is intended to cover all modifications, equivalents, and alternatives falling within the scope of the present disclosure as defined by the appended claims.

DETAILED DESCRIPTION OF THE DISCLOSURE

In the following detailed description, reference is made to the accompanying drawings which form a part hereof, and in which is shown by way of illustration specific embodiments in which the present disclosure is practiced. These embodiments are described in sufficient detail to enable those skilled in the art to practice the present disclosure, and it is to be understood that other embodiments can be utilized and that structural changes can be made without departing from the scope of the present disclosure. Therefore, the following detailed description is not to be taken in a limiting sense, and the scope of the present disclosure is defined by the appended claims and their equivalents.

Reference throughout this specification to "one embodiment," "an embodiment," or similar language means that a particular feature, structure, or characteristic described in connection with the embodiment is included in at least one embodiment of the present disclosure. Appearances of the phrases "in one embodiment," "in an embodiment," and similar language throughout this specification may, but do not necessarily, all refer to the same embodiment. Similarly, the use of the term "implementation" means an implementation having a particular feature, structure, or characteristic described in connection with one or more embodiments of the present disclosure, however, absent an express correlation to indicate otherwise, an implementation may be associated with one or more embodiments. Furthermore, the described features, structures, or characteristics of the subject matter described herein may be combined in any suitable manner in one or more embodiments.

For the purposes of promoting an understanding of the principles of the present disclosure, reference is now made to the embodiments illustrated in the drawings, which are described below. The exemplary embodiments disclosed herein are not intended to be exhaustive or to limit the disclosure to the precise form disclosed in the following detailed description. Rather, these exemplary embodiments were chosen and described so that others skilled in the art may utilize their teachings.

The terms "couples," "coupled," and variations thereof are used to include both arrangements wherein two or more components are in direct physical contact and arrangements wherein the two or more components are not in direct contact with each other (e.g., the components are "coupled" via at least a third component), but yet still cooperate or interact with each other. Furthermore, the terms "couples," "coupled," and variations thereof refer to any connection for machine parts known in the art, including, but not limited to, connections with bolts, screws, threads, magnets, electromagnets, adhesives, friction grips, welds, snaps, clips, etc.

As utilized herein, terms "controller," "system," "interface," and the like are intended to refer to a computer-related entity, either hardware, software (e.g., in execution), and/or firmware. For example, a controller can be a process running on a processor, the processor itself, a program, and/or a computer. By way of illustration, both an application running on a server and the server can be a controller. One or more controllers can reside within a processor and a controller can be localized on one computer and/or distributed between two or more computers.

Throughout the present disclosure and in the claims, numeric terminology, such as first and second, is used in reference to various components or features. Such use is not intended to denote an ordering of the components or features. Rather, numeric terminology is used to assist the reader in identifying the component or features being referenced and should not be narrowly interpreted as providing a specific order of components or features.

Figure 2:
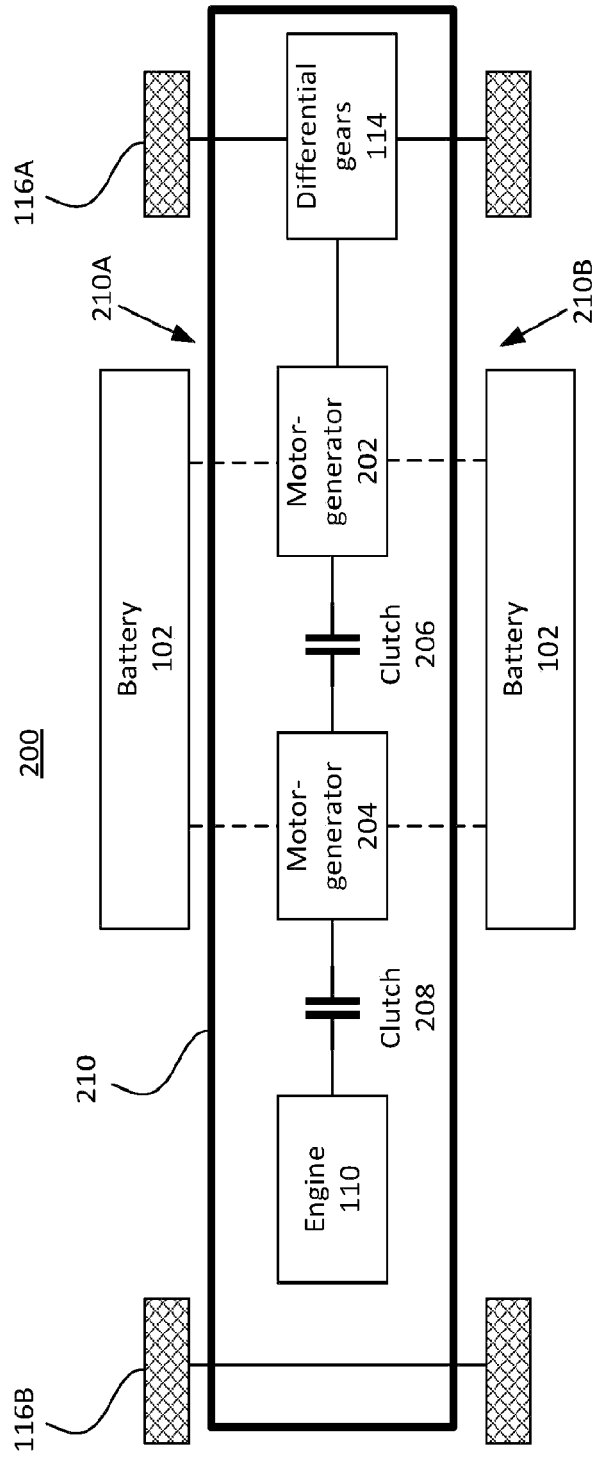
FIG. 2 is a schematic diagram of a multi-mode adjustable hybrid vehicle system as known in the art.

FIG. 3A shows an example of a multi-mode hybrid vehicle system 300 as disclosed herein. The system 300 includes a chassis frame 210 which includes all components therein. The components include an integrated axle 302, a drive axle 304, engine 110, battery 102, the motor-generator 204, and two clutches 206 and 208. The battery 102, or batteries in some embodiments, is electrically coupled with the motor-generator 204 as well as the integrated axle 302, whereas the engine 110 is mechanically coupled with the motor-generator 204 via the clutch 208. The motor-generator 204 in turn is mechanically coupled with the drive axle 304 via the clutch 206. The motor-generator 204 is an alternating current (AC) motor connected with the battery 102 via an inverter (not shown). The motor-generator 204 is controlled by a controller (not shown) as further explained herein. The chassis frame 210 includes two side frame rails 210A and 210B extending between the two pairs of wheels 116A and 116B, sandwiching the battery 102 therebetween. As such, the battery 102 is disposed or located within a space defined between the two side frame rails 210A and 210B instead of outside this space, such as shown in the prior-art system 200 of FIG. 2.

As disclosed herein, an "integrated axle" is a type of electric axle drive that is affixed to the wheels to rotate them. The integrated axle combines the functionality of an electric motor-generator, power electronics such as an inverter, and in some examples a cooling circuit to reduce cost and increase efficiency in a single component. Integrated axles are neither directly nor indirectly coupled with any combustion engine, thereby using solely the motor-generator included therein to provide mechanical power to a drive axle coupled thereto.

In some examples, the motor-generator of the integrated axle may be mounted on the drive axle. In some embodiments, the integrated axle is configured to reduce interfaces and components that may induce efficiency loss. Examples of such components include wires and copper cables that link the components together, plugs, bearings for rotating components, and separate cooling circuits for the electric motor and power electronics. The integrated axles are also more compact than the electric motor, the power electronics, and the cooling circuits therefor being individually installed, thus saving installation space within the chassis frames of the vehicle and allowing more room therein. Each integrated axle is configured independently of other integrated axle(s)

in the system. In some examples, the integrated axle may also include a two-speed or three-speed gearbox.

As shown in the embodiment of FIG. 3A, the integrated axle 302 is mechanically coupled with the first pair of wheels 116A and the drive axle 304 is mechanically coupled with the second pair of wheels 116B. Although not shown, a controller is electrically coupled with the integrated axle 302, the motor-generator 204, and the clutches 206 and 208. Based on the inputs received, the controller turns on (activates or engages) or turns off (deactivates or disengages) one or more of these components to achieve the different modes shown herein.

FIG. 3B shows some of the components of the integrated axle 302. For example, the integrated axle 302 includes a motor-generator 306, a drive axle 308, and two mechanical connections 310A and 310B which mechanically couple with the wheels 116A. Other components such as the aforementioned inverter and/or cooling circuit may be included in the integrated axle 302, as suitable. The components of the integrated axle 302 (e.g., the electric motor-generator 306 and at least a portion of the drive axle 308, etc.) may be mechanically mated to, coupled to, affixed to, or implemented within a common housing. The housing may be any suitable structure which supports the positioning of the components, as well as to provide protection of the components, among other purposes disclosed further herein.

As shown in Table 1 below, the Modes include a fully Electric Vehicle mode (EV), advanced EV mode (EV+), Series mode, Parallel mode, advanced Parallel mode (Parallel+), Regenerative braking mode (Regen), and advanced Regenerative braking mode (Regen+). The difference between a normal mode and an advanced mode is that the advanced mode enables both of the motor-generators to be activated to assist in driving the vehicle, instead of just one of the motor-generators in the normal mode.

TABLE 1

Different Modes achieved by activating/deactivating components of hybrid system.

| Modes | MG 306 | MG 204 | Engine | Clutch 206 | Clutch 208 |
|---|---|---|---|---|---|
| EV | ON | OFF | OFF | OFF | ON |
| EV+ | ON | ON | OFF | ON | OFF |
| Series | ON | ON | ON | OFF | ON |
| Parallel | ON | OFF | ON | ON | ON |
| Parallel+ | ON | ON | ON | ON | ON |
| Regen | ON | OFF | OFF | OFF | ON |
| Regen+ | ON | ON | OFF | ON | OFF |

According to Table 1, the EV mode is applied when the motor-generator (MG) 306 and the clutch 208 are activated. Because the clutch 206 is open, with motor-generator 204 and engine 110 both turned off, the state of the clutch 208 (whether it is on or off) has no effect on the performance of the vehicle. Therefore, instead of applying external energy to keep the clutch 208 open (deactivated), the clutch 208 can be kept in its free state of being closed (activated). The EV+ mode further implements the other motor-generator 204 to assist the function of the motor-generator 306 by also engaging the clutch 206 and the motor-generator 204. That is, the motor-generator 204 provides additional power to the vehicle as the motor-generator 306 operates.

In the Series mode, all but the clutch 206 are engaged, such that the engine 110 provides mechanical power to the motor-generator 204 which converts it to electrical power for charging the battery 102 because the clutch 206 is disengaged thus preventing the motor-generator 204 from providing mechanical power to the drive axle 304. The motor-generator 306 uses the battery 102 to gain electrical power and provides mechanical power to the integrated axle 302.

In the Parallel mode, all but the motor-generator 204 are activated, such that the motor-generator 306 and the engine 110 provide mechanical power to drive the vehicle. Specifically, the motor-generator 306 activates the integrated axle 302 to move the wheels 116A, and the engine 110 activates the drive axle 304 to move the wheels 116B. In the Parallel+ mode, the motor-generator 204 is also activated (thus activating all the components listed above), causing the engine 110 to provide mechanical power to the motor-generator 204. The motor-generators 306 and 204 provide mechanical power to the drive axles 308 and 304, respectively.

In the Regen mode, the only activated component is the motor-generator 306 to enable regenerative braking during vehicle deceleration, where mechanical power from the wheels 116A are converted to electrical power by the motor-generator 306 to power the battery 102. In the Regen+ mode, the clutch 206 is engaged, the clutch 208 is disengaged, and the motor-generator 204 is activated in addition to the motor-generator 306, so both of the motor-generators are used to convert the mechanical power into electrical power to power the battery 102. The Regen+ mode is capable of converting more of the mechanical power, thus providing greater regeneration-than the normal Regen mode.

As shown, the embodiments as disclosed herein utilize series, parallel, and EV modes effectively to eliminate transmission while meeting the performance requirements in gradeability and acceleration. Furthermore, in order to synchronize all the components with each other, the controller, which may include at least one microprocessor, RAM, ROM and I/O interface, for example, is used.

Additionally, even though the transmission is eliminated from the system 300, the engine 110 is still capable of providing mechanical power to the drive axle 304. Typically, a transmission shifts through different gear ratios to provide sufficient amount of power that is required to operate the vehicle, such as using a gear with a higher ratio when the vehicle is to move at a higher speed while maintaining the engine's revolution-per-minute (RPM) relatively low. In the embodiments disclosed, the motor-generator 204 is configured to provide mechanical power to the drive axle 304 when the vehicle is operating below a predetermined threshold RPM value (for example, 1000 rpm or any other suitable RPM) or below a predetermined speed (for example, 40 mph or any other suitable speed). However, when the vehicle is operating above this threshold RPM, the clutches 206 and 208 are engaged and the engine 110 is activated to provide mechanical power to the drive axle 304 instead of the motor-generator 204. Because the engine 110 cannot change gears due to the lack of transmission, the engine 110 provides mechanical power in a specific RPM range. For example, if the lower threshold is 1000 rpm, the higher threshold of the RPM range may be 2000 rpm, or any other suitable RPM; when the vehicle exceeds the higher threshold, the motor-generator 204 may assist in providing the remaining mechanical power that is required. In some examples, additional information is used to determine whether the engine 110 can provide mechanical power to the drive axle 304, such as an indication that the vehicle is traveling on a highway or any environment that indicates the vehicle is traveling at a constant high speed. The indication may be based on lookahead data (including but not limited to GPS or vehicle trip schedule data, for example) or driver input (including but not limited to an input from the driver to enable cruise control for the vehicle).

Figure 4:
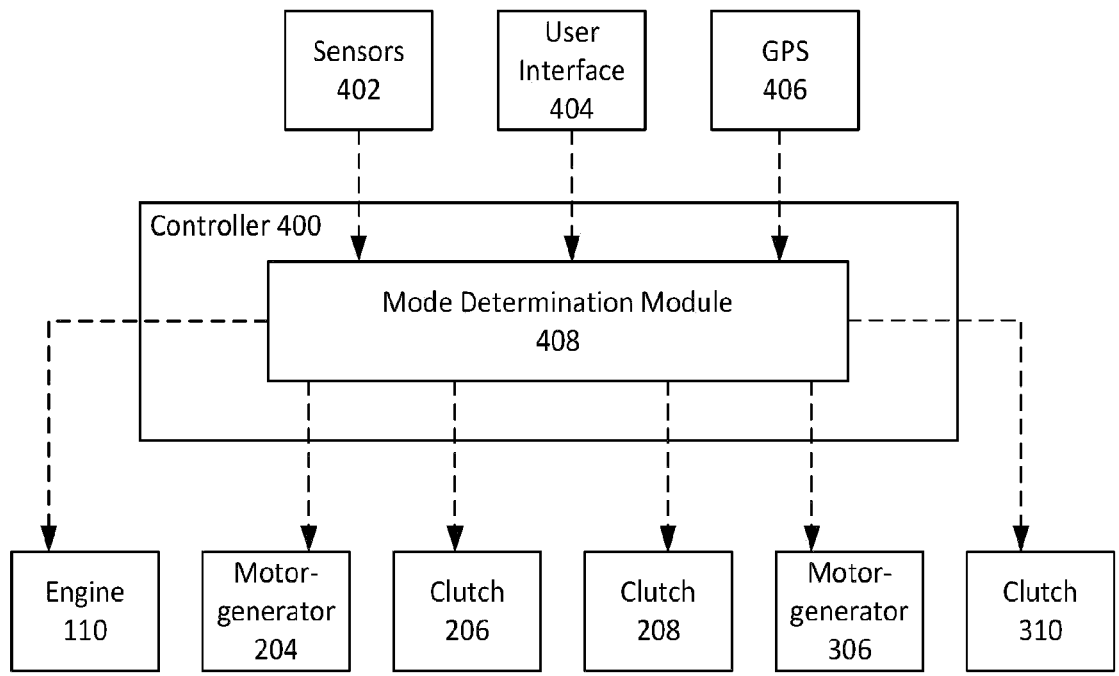
FIG. 4 is a schematic diagram of a controller operatively coupled with other components of the system.

FIG. 4 shows an example of how a controller 400 is used to control the operation of the system 300 according to some embodiments. The controller 400 is electrically coupled with a plurality of sensors 402, user interface 404, and a global positioning system (GPS) 406, for example, and receives data signals via a receiver (not shown). Other electronic components may also be coupled with the controller 400 as explained herein. Furthermore, the controller 400 is electrically coupled with the engine 110, motor generators 306 and 204, and clutches 206, 208. The controller 400 outputs control signals via a transmitter (not shown) in order to control the functioning of one or more of the aforementioned components. The electrical coupling allows for input signals to be sent to the controller 400 and output signals to be sent from the controller 400. The controller 400 comprises a mode determination module 408 which receives the input signals from the sensors 402, user interface 404, and GPS 406 and makes a determination as to which mode the vehicle needs to be and executes mode change when suitable.

The controller 400 may include any suitable combination of hardware, firmware and/or software to input a number of system signals and output a number of control signals to affect the desired operation of vehicle. Signals may be input from the sensors 402 and/or actuators (not shown) into the controller 400 from a CAN bus architecture, as is known in the art.

For example, the sensors 402 may be vehicle speed sensors or accelerometers that measure how fast the vehicle is currently traveling or the acceleration thereof. The user interface 404 may be the brake pedal or accelerator pedal of the vehicle that can be activated by the user, or a display in the vehicle that can receive user input via buttons or touch-screens, for example. The GPS 406 may be implemented in the vehicle itself (as part of the vehicle navigation system, for example) or installed on a mobile device of the user. The user may be the driver or any other passenger present in the vehicle.

Figure 5:
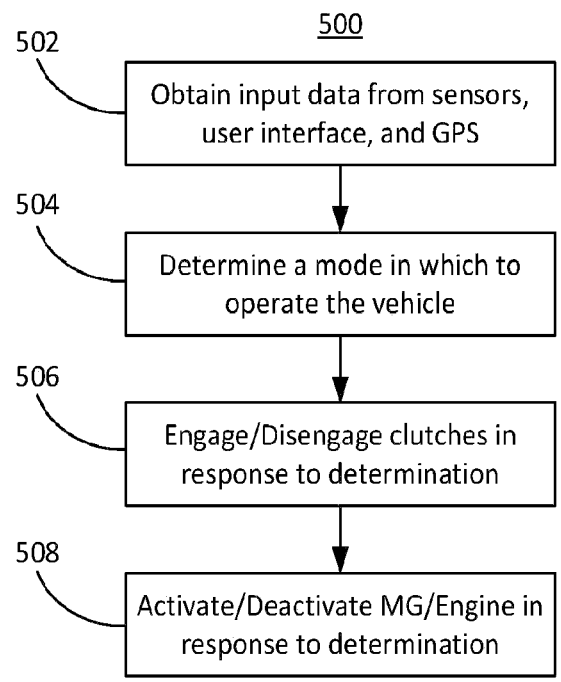
FIG. 5 is a flow chart illustrating a method of operating a controller.

The mode determination module 408 uses the inputs collectively gathered to make a decision as to the next mode of operation for the vehicle. FIG. 5 illustrates an example of a method 500 with steps as utilized by the mode determination module of the controller. In some examples, the mode determination module obtains data input from the sensors, user interface, and GPS; 502. The module then uses the obtained data input to determine the mode of operation; 504. The mode of operation may be chosen from EV, EV+, Series, Parallel, Parallel+, Regen, and Regen+ as shown in Table 1. Then, the module engages or disengages the clutches as necessary; 506. Thereafter, the module activates or deactivates one or more of the engine and motor-generators to operate in the determined mode; 508.

For example, the module 408 may determine that EV or EV+ mode is preferable based on the user's power demand for the vehicle or the GPS input. The power demand may be obtained from the position of the accelerator pedal (that is, the driver is stepping on the pedal to indicate a demand for more power to further accelerate the vehicle). The GPS input may indicate whether the vehicle is approaching areas that require low or zero emission from vehicles, such as "low emission zones", "ultra-low emission zones", or "zero emission zones". The GPS-based geofencing can be used as the mechanism to switch hybrid vehicles to its zero emission drive cycle, which would mean that the vehicle can only be driven in EV or EV+ mode to reduce emissions.

The Series mode may be selected under certain conditions such as the battery 102 having a low voltage or state of charge. In the event that the battery 102 has low voltage due to lack of charge or any other reason such as battery failure, the amount of power provided by the motor-generator 204 or 206 would be reduced, therefore requiring the use of the engine 110 as the main source of mechanical power for the vehicle. In this case, the sensors 402 may be voltage sensors that are coupled with the battery or batteries 102 to measure how much electrical power can be provided.

The Parallel or Parallel+ mode may be selected when there is increased demand for power in order to accelerate the vehicle. Also, the Parallel or Parallel+ mode may be selected when the vehicle's speed is greater than a threshold value, such as when the vehicle is driving on a highway with light traffic. For example, the driver may step on the accelerator pedal to increase acceleration. If the amount of power that is needed can be predicted using speedometer, accelerometer, and inclinometer, for example. The speedometer determines the current speed, the accelerometer determines the current acceleration, and the inclinometer determines the current slope of the road on which that vehicle is being driven. The power demand increases if the vehicle is traveling in high speed, requires high acceleration, and/or is driving on a positive slope with a greater incline. In some examples, these sensors may be replaced by the GPS, since the GPS location can track the location of the vehicle over a span of time to calculate its speed and acceleration, as well as determining the terrain or road condition of the surrounding area to determine any incline on the road.

The Regen or Regen+ mode may be selected via user input, for example when the driver steps on a brake pedal. The amount of deceleration necessary is determined by how hard the pedal is being stepped on, such that when there is a need for a slow deceleration, the normal Regen mode is activated, but when there is a need for the vehicle to stop immediately, the Regen+ mode may be activated. The demand for deceleration may be indirectly measured using sensors such as the speedometer previously mentioned. Other factors such as battery SOC, component temperatures, road conditions, and/or drivability preferences can be considered for the selection of Regen+ mode.

Advantages of using the multi-mode hybrid vehicle system as disclosed herein includes the ability to use multiple modes while eliminating the need for a transmission, a.k.a. gearbox, to be coupled with the engine. Typically, the transmission adapts the output of the engine, which may be an internal combustion engine (ICE), to the drive wheels.

Furthermore, the multi-mode hybrid vehicle system as disclosed herein also permits energy recuperation from both of the integrated axles, instead of just one of the axles. Specifically, in the Regen+ mode as explained above, both of the motor-generators can be activated to provide regenerative braking, which provides greater power regeneration than when only one motor-generator provides the regenerative braking. As such, in Regen+ mode, the regenerative braking can be achieved using both the front and the rear drive axles in a 4WD vehicle.

Additional advantages lie in the improved flexibility of the Parallel+ mode where all the components (both motor-generators, both clutches, and the engine) are activated or engaged to boost the amount of power provided by the system. As the tractive power is shared between both integrated axles, the overall performance is better than when only one of the motor-generators or only the engine is providing the mechanical power to drive the vehicle.

Figure 1B:
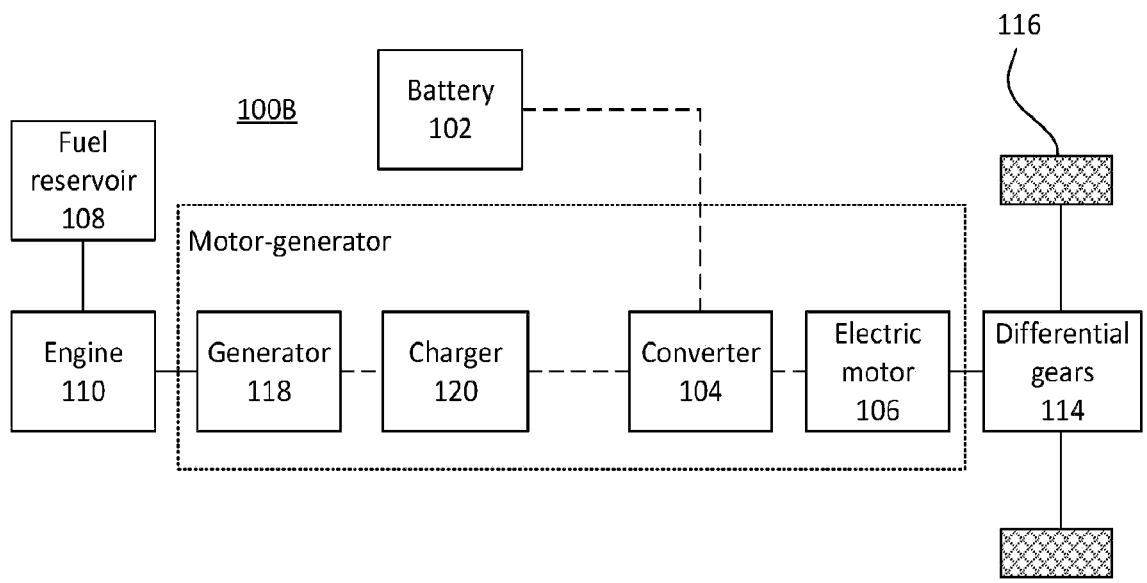
FIG. 1B is a schematic diagram of a series hybrid vehicle system as known in the art.
Figure 3:
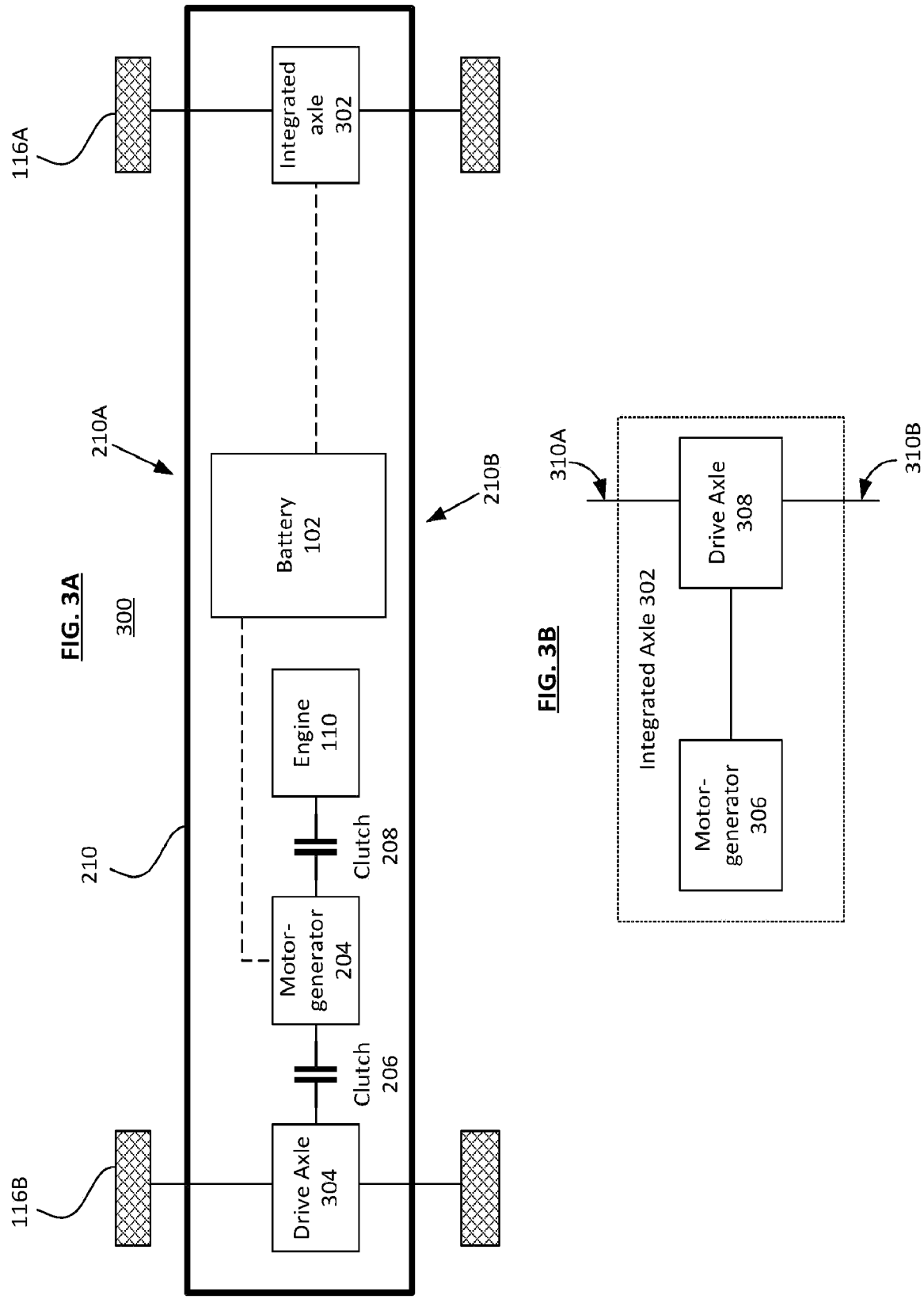
FIG. 3A is a schematic diagram of a multi-mode hybrid vehicle system according to some embodiments.
FIG. 3B is a schematic diagram of an integrated axle according to some embodiments.
Figure 8:
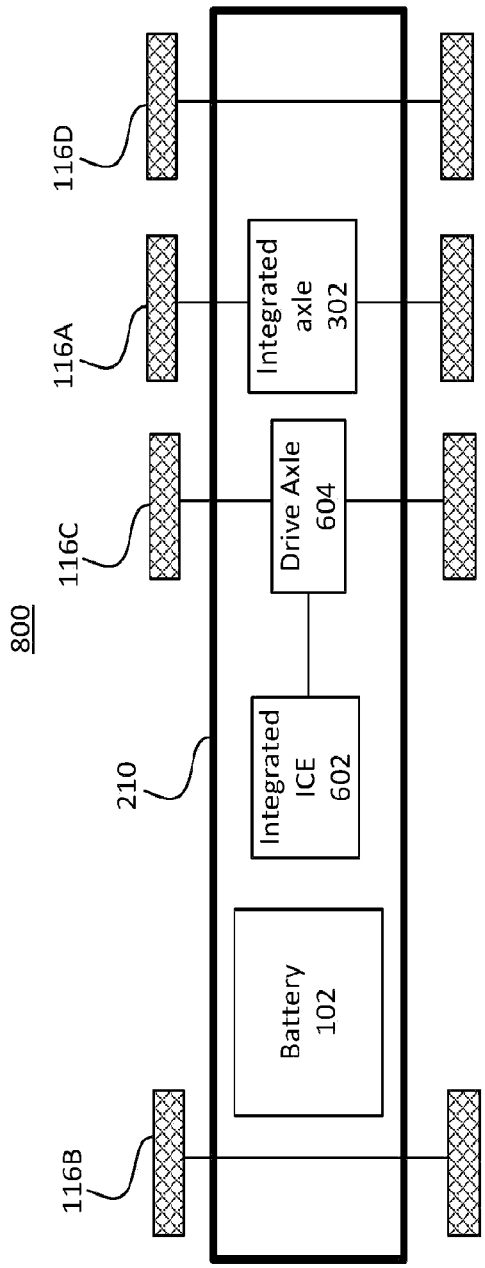
FIG. 8 is a schematic diagram of a 8×4 drivetrain hybrid system according to some embodiments.

The architecture of the presently disclosed embodiments is also found to allow for not only better regeneration potential, but also for the integrated axles and battery to be mounted between the chassis frames due to the lack of a transmission for the engine being installed in the chassis frames. Furthermore, it is generally known that series hybrid system (as shown in FIG. 1B, for example) has better regeneration potential, improved fuel economy, and a more extended EV range than parallel hybrid system (as shown in FIG. 1A, for example) in some applications. On the other hand parallel hybrid is more suitable for linehaul type applications. The disclosed architecture (that is, the multi-mode hybrid system 300 as shown in FIG. 3, for example) offers the advantages of both series and parallel hybrid systems with an improved regeneration potential. The multi-mode hybrid system as disclosed herein also allows for smaller component sizes compared to the known series hybrid system architecture and it enables modular design that can be extended to vehicles with more than four wheels FIGS. 6 through 8 illustrate embodiments of the multi-mode hybrid system in which there are more than four wheels in the vehicle. Specifically, FIG. 6 shows a six-wheeled multi-mode hybrid system 600 where the first pair of wheels 116A is mechanically coupled with the first integrated axle 302 and the second pair of wheels 116B is mechanically coupled with the second integrated axle 603. The additional third pair of wheels 116C is mechanically coupled with a drive axle 604 which in turn is coupled with an integrated internal combustion engine (ICE) 602.

Figure 9:
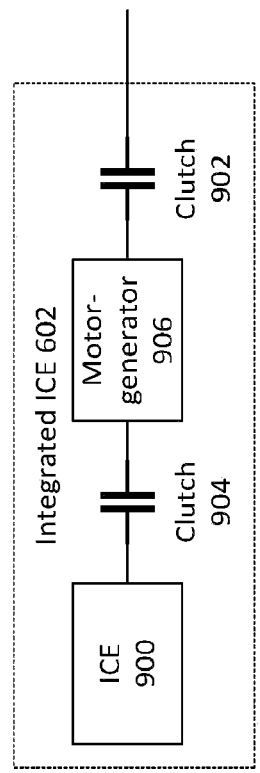
FIG. 9 is a schematic diagram of the components in an integrated internal combustion engine according to some embodiments.

The integrated ICE can be a multi-mode engine that includes an ICE and an electric motor, as well as two clutches positioned such that one clutch mechanically couples the ICE with the electric motor-generator, and the other clutch couples the electric motor-generator and a drive axle, for example. In some examples, the motor-generator may be mounted to the engine. FIG. 9 illustrates this example, where the integrated ICE 602 has an ICE 900, two clutches 902 and 904, as well the motor-generator 906. The clutch 902 is disengaged for EV mode. In EV+ mode, the clutch 902 is engaged and 904 is disengaged, and the motor-generator 906 and both of the integrated axles 302 and 603 are powering the wheels 116 while the ICE 900 is deactivated. When the ICE 900 and the motor-generator 906 are coupled through the clutch 904 and disengaged from the wheels 116C by disengaging the clutch 902, the system offers Series mode. When the clutches 902 and 904 are both engaged, the system offers Parallel mode. Similar to the integrated axle 302 of FIG. 3B, the components of the integrated ICE 602 (e.g., the ICE 900, the clutches 902 and 904, and the motor-generator 906, etc.) may be mechanically mated to, coupled to, or implemented within a common housing. The housing may be any suitable structure which supports the positioning of the components, as well as to provide protection of the components, among other purposes disclosed further herein.

As shown in FIG. 6, in some embodiments, the integrated ICE 602 is mechanically coupled with the drive axle 604 for one pair of wheels 116C while the remaining pairs of wheels 116A and 116B each has the integrated axle 302 or 603 coupled therewith, in a way previously disclosed with regard to FIG. 3A. It is to be understood that the components of FIG. 3A are implementable into the embodiment of FIG. 6 such that all wheels 116A, 116B, and 116C are connected to a power source to enable the axles to receive as much power as possible when needed, forming a 6×6 drivetrain (six-wheel drive for six wheels, essentially an all-wheel drive).

FIG. 7 illustrates an eight-wheeled multi-mode hybrid system 700 where a fourth pair of wheels 116D is inserted between the pairs 116A and 116C as shown, where the inserted pair 116D includes the integrated axle 603 coupled therewith, and the pair 116B is not coupled with any engine or motor so the pair 116B does not directly receive mechanical power, thus forming an 8×6 drivetrain (a six-wheel drive with eight wheels). Based on the application and vehicle need, any three of the four axles can be powered mechanically.

FIG. 8 illustrates an eight-wheeled multi-mode hybrid system 800 where two of the four pairs of wheels are not directly coupled with any engine or motor. Therefore, only wheels 116A and 116C are essentially receiving mechanical power from the engine (e.g. integrated ICE 602) or motor (e.g. motor-generator, not shown), forming an 8×4 drivetrain (a four-wheel drive with eight wheels). Based on the application and vehicle need, any two of the four axles can be powered mechanically.

For clarity, the wheels 116 may be separately defined based on their position on the chassis frames 210. For example, in FIG. 6, the set of wheels 116A and 116B may be defined as "outer wheels" because they are positioned on the outermost part of the chassis 210, whereas the remaining wheels 116C are defined as "inner wheels" because they are positioned between the outer wheels 116A and 116B and have access to an internal space 606 between the chassis 210 to position additional components such as the battery 102 and integrated ICE 602, which tend to take up more space than an integrated axle 302 or 603. In comparison, in FIG. 7, the additional wheels 116D may be considered outer wheels because they have no access to the internal space. In this respect, the wheels 116C are consistently defined as internal wheels due to their accessibility to the components located within the internal space 606.

In some of the embodiments disclosed herein, there is a housing to which various components are mechanically mated, coupled, or affixed (for example, the common housing of the integrated axle 302 in FIG. 3B and the common housing of the integrated ICE 602 in FIG. 9 as previously explained). The housing may provide physical protection and component reinforcement structure designed to provide protection against road hazards, water, blasts (e.g., for military applications). A housing may also serve as the structural part of the system, thereby minimizing stress on motors, generators, clutch systems which could be experienced from the vehicle dynamics, frame and body twisting or bending, etc. In addition, a housing may also extend the life and durability of motors, generators, and clutch components.

The housing may be designed to allow for radially and axially aligning of components, such as clutch components and electric motor-generators with respect to each other for ease of assembly and long term reliability, and may also comprise physical mounting interface for an engine and a propeller shaft or other power transmission device.

In one embodiment, the housing may be of modular design, whereby the housing may not necessarily be of a unitary design (i.e., housing all or substantially all of the various components of the powertrain). It may be possible that the housing comprises different portions—where one portion may house or otherwise contain one or more of the components of the powertrain (and, possibly, without regard as to whether any of the components come stocked with their own separate housing structure). It may be possible that the portions cover and protect one or more such powertrain components. In addition, each of these portions may be mechanically coupled to each other (e.g., by bolts, screws, welds or the like). Alternatively, each portion may be mechanically coupled to the vehicle itself and the portions placed such that each provides protection to one or more components of the powertrain.

Also, in some embodiments of the present application, it may be desirable to have the housing as a structure that may provide a high integrity, common electrical ground for motors and generators and other electronics requiring low impedance path to ground and a common ground to other components. To provide possible Electro-Magnetic Compatibility (EMC), the housing may use any suitable materials for attenuating both electric field and magnetic field radiated emissions. In addition, electrical and control cables routed to the housing structure may comprise effectively grounding gross cable shields to minimize interference from radiated emissions.

Furthermore, the housing may serve as a structural part of the system to minimize stress on motor-generators, clutch systems which could be experienced from the vehicle dynamics, frame and body twisting or bending, etc. With a robust housing, such a design may tend to extend the life and durability of motors, generators, and clutch components and/or allow the use of lighter duty components that may not need to be designed to survive all the vehicle torsional and dynamics via their own design. In addition, the housing may be designed to be water-tight for amphibious applications or to allow the use of lower cost non-environmental components.

While the embodiments have been described as having exemplary designs, the present embodiments can be further modified within the spirit and scope of this disclosure. This application is therefore intended to cover any variations, uses, or adaptations of the disclosure using its general principles. Further, this application is intended to cover such departures from the present disclosure as come within known or customary practice in the art to which this disclosure pertains and which fall within the limits of the appended claims.

Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements. The scope is accordingly to be limited by nothing other than the appended claims, in which reference to an element in the singular is not intended to mean "one and only one" unless explicitly so stated, but rather "one or more."

Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B or C may be present in a single embodiment; for example, A and B, A and C, B and C, or A and B and C.

Systems, methods and apparatus are provided herein. In the detailed description herein, references to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic with the benefit of this disclosure in connection with other embodiments whether or not explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element herein is to be construed under the provisions of 35 U.S.C. § 112(f), unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. A hybrid powertrain system comprising:
an integrated axle configured to provide mechanical power to a first pair of wheels, the integrated axle comprising a first motor-generator and a first drive axle such that the first motor-generator and at least a portion of the first drive axle are mechanically coupled to a common housing;
a second motor-generator configured to be mechanically coupled with an engine via a first clutch and mechanically coupled with a second drive axle via a second clutch, the second drive axle mechanically coupled with a second pair of wheels; and
a controller electrically coupled with the first and second motor-generators, the engine, and the first and second clutches, the controller configured to enable a fully electric mode, a series hybrid mode, a parallel hybrid mode, and a regenerative mode of operation,
wherein the hybrid powertrain system is implemented in a hybrid vehicle in which the engine is configured to provide mechanical power without a transmission to the second drive axle when the hybrid vehicle is operating in a predetermined operating mode, the predetermined operating mode having a revolutions-per-minute (RPM) range.

2. The hybrid powertrain system of claim 1, further comprising:
a plurality of sensors, a user interface, and a global positioning system (GPS) electrically coupled with the controller,
wherein the controller comprises a mode determination module configured to determine which of the modes to activate based on input data obtained from the plurality of sensors, the user interface, and the GPS.

3. The hybrid powertrain system of claim 2, the controller configured to:
obtain the input data from the sensors, the user interface, and the GPS;
determine a mode in which to operate the hybrid powertrain system;
engage or disengage at least one of the first or second clutch in response to the determination; and activate or deactivate at least one of the first motor-generator, the second motor-generator, or the engine in response to the determination.

4. The hybrid powertrain system of claim 1, wherein the controller is further configured to enable an advanced fully electric mode that provides greater driving power than the fully electric mode, an advanced parallel hybrid mode that provides greater driving power than the parallel hybrid mode, and an advanced regenerative mode that provides greater braking power than the regenerative mode.

5. The hybrid powertrain system of claim 1, further comprising a third pair of wheels mechanically coupled with a second integrated axle.

6. The hybrid powertrain system of claim 5, further comprising a fourth pair of wheels.

7. The hybrid powertrain system of claim 5, the second integrated axle comprising a third motor-generator coupled with a third drive axle.

8. The hybrid powertrain system of claim 7, wherein the regenerative mode of operation enables regenerative braking on the first, second, and third drive axles.

9. The hybrid powertrain system of claim 1, wherein the engine is an internal combustion engine (ICE) such that the ICE and the second motor-generator form an integrated ICE that is mechanically coupled to the common housing.

10. The hybrid powertrain system of claim 1, further comprising:
   a chassis connecting the first and second pairs of wheels, the chassis comprising two side frame rails each connecting the first pair of wheels with the second pair of wheels, and
   a battery disposed in a space between the two side frame rails and electrically coupled with the first and second motor-generators.

11. The hybrid powertrain system of claim 1, wherein the regenerative mode of operation enables regenerative braking on both the first and second drive axles.

12. A controller for a hybrid vehicle powertrain system, comprising:
   a receiver configured to receive data signals from one or more of: sensors, user interface, or global positioning system (GPS);
   a mode determination module configured to determine, based on the received data signals, whether to enable a fully electric mode, an advanced fully electric mode that provides greater driving power than the fully electric mode, a series hybrid mode, a parallel hybrid mode, an advanced parallel hybrid mode that provides greater driving power than the parallel hybrid mode, a regenerative mode of operation, or an advanced regenerative mode that provides greater braking power than the regenerative mode; and
   a transmitter configured to transmit, based on the determination, control signals to:
      an integrated axle configured to provide mechanical power to a first pair of wheels, the integrated axle comprising a first motor-generator and a first drive axle such that the first motor-generator and at least a portion of the first drive axle are mechanically coupled to a common housing, and
      an engine, a first clutch, a second clutch, and a second motor-generator configured to be mechanically coupled with the engine via the first clutch and mechanically coupled with a second drive axle via the second clutch, the second drive axle mechanically coupled with a second pair of wheels.

13. The controller of claim 12, wherein the control signals are configured to:
   engage or disengage at least one of the first or second clutch in response to the determination; and
   activate or deactivate at least one of the first motor-generator, the second motor-generator, or the engine in response to the determination.

14. The controller of claim 12, wherein the hybrid vehicle powertrain system is implemented in a transmission-less hybrid vehicle in which the engine is configured to provide mechanical power to the second drive axle when the hybrid vehicle is operating within a predetermined revolutions-per-minute (RPM) threshold range.

15. The controller of claim 14, wherein the transmission-less hybrid vehicle includes a third pair of wheels mechanically coupled with a second integrated axle, the second integrated axle includes a third motor-generator coupled with a third drive axle, and the regenerative mode of operation enables regenerative braking on the first, second, and third drive axles.

16. A method of powering a powertrain system of a hybrid vehicle, comprising:
   receiving, by a receiver, data signals from one or more of: sensors, user interface, or global positioning system (GPS);
   determining, by a mode determination module based on the received data signals, whether to enable one of the following modes: a fully electric mode, an advanced fully electric mode that provides greater driving power than the fully electric mode, a series hybrid mode, a parallel hybrid mode, an advanced parallel hybrid mode that provides greater driving power than the parallel hybrid mode, a regenerative mode of operation, or an advanced regenerative mode that provides greater braking power than the regenerative mode; and
   transmitting, by a transmitter based on the determined mode, control signals to at least one of: an integrated axle, an engine, a first clutch, a second clutch, or a second motor-generator,
   the integrated axle configured to provide mechanical power to a first pair of wheels, the integrated axle comprising a first motor-generator and a first drive axle such that the first motor-generator and at least a portion of the first drive axle are mechanically coupled to a common housing, and
   the second motor-generator configured to be mechanically coupled with the engine via the first clutch and mechanically coupled with a second drive axle via the second clutch, the second drive axle mechanically coupled with a second pair of wheels.

17. The method of claim 16, wherein transmitting the control signals further comprise:
   engaging or disengaging at least one of the first or second clutch in response to the determination; and
   activating or deactivating at least one of the first motor-generator, the second motor-generator, or the engine in response to the determination.

18. The method of claim 16, wherein the hybrid vehicle is a transmission-less hybrid vehicle in which the engine is configured to provide mechanical power to the second drive axle when the hybrid vehicle is operating within a predetermined revolutions-per-minute (RPM) threshold range.

19. The method of claim 18, wherein the hybrid vehicle includes a third pair of wheels mechanically coupled with a second integrated axle, the second integrated axle includes a third motor-generator coupled with a third drive axle, and the regenerative mode of operation enables regenerative braking on the first, second, and third drive axles.

\* \* \* \* \*